(12) United States Patent
Jackson

(10) Patent No.: US 7,771,523 B2
(45) Date of Patent: Aug. 10, 2010

(54) INK JET INK

(75) Inventor: Christian Jackson, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 30 days.

(21) Appl. No.: 12/148,053

(22) Filed: Apr. 15, 2008

(65) Prior Publication Data

US 2009/0020037 A1 Jan. 22, 2009

Related U.S. Application Data

(60) Provisional application No. 60/925,439, filed on Apr. 20, 2007.

(51) Int. Cl.
*C09D 11/02* (2006.01)

(52) U.S. Cl. .................... 106/31.27; 106/31.6

(58) Field of Classification Search ............. 106/31.27, 106/31.6
See application file for complete search history.

(56) References Cited

U.S. PATENT DOCUMENTS

| | | | |
|---|---|---|---|
| 5,554,739 A | 9/1996 | Belmont | |
| 5,571,311 A | 11/1996 | Belmont et al. | |
| 5,609,671 A | 3/1997 | Nagasawa | |
| 5,672,198 A | 9/1997 | Belmont | |
| 5,698,106 A | 12/1997 | Larsson et al. | |
| 5,718,746 A | 2/1998 | Nagasawa et al. | |
| 5,749,950 A | 5/1998 | Mahmud et al. | |
| 5,803,959 A | 9/1998 | Johnson et al. | |
| 5,837,045 A | 11/1998 | Johnson et al. | |
| 5,846,307 A | 12/1998 | Nagasawa et al. | |
| 5,895,522 A | 4/1999 | Belmont et al. | |
| 5,922,118 A | 7/1999 | Johnson et al. | |
| 5,928,419 A | 7/1999 | Uemura et al. | |
| 5,968,243 A | 10/1999 | Belmont et al. | |
| 6,034,153 A * | 3/2000 | Tsang et al. | 523/160 |
| 6,069,190 A | 5/2000 | Bates et al. | |
| 6,123,759 A | 9/2000 | Mise et al. | |
| 6,221,142 B1 | 4/2001 | Wang et al. | |
| 6,221,143 B1 | 4/2001 | Palumbo | |
| 6,281,267 B2 | 8/2001 | Parazak | |
| 6,287,374 B1 | 9/2001 | Yanagida et al. | |
| 6,323,257 B1 | 11/2001 | Moffatt et al. | |
| 6,328,894 B1 | 12/2001 | Chan et al. | |
| 6,329,446 B1 | 12/2001 | Sacripante et al. | |
| 6,332,919 B2 | 12/2001 | Osumi et al. | |
| 6,375,317 B1 | 4/2002 | Osumi et al. | |
| 6,398,858 B1 | 6/2002 | Yu et al. | |
| 6,402,825 B1 | 6/2002 | Sun | |
| 6,468,342 B1 | 10/2002 | Itoh et al. | |
| 6,503,311 B1 | 1/2003 | Karl et al. | |
| 6,506,245 B1 | 1/2003 | Kinney et al. | |
| 6,802,893 B1 * | 10/2004 | Komatsu et al. | 106/31.6 |
| 6,852,156 B2 | 2/2005 | Yeh et al. | |
| 2004/0233263 A1 | 11/2004 | Goto et al. | |
| 2005/0020730 A1 | 1/2005 | Valentini et al. | |
| 2005/0032930 A1 | 2/2005 | Jackson | |
| 2005/0087105 A1 | 4/2005 | Taniguchi et al. | |
| 2006/0162612 A1 | 7/2006 | Kabalnov et al. | |
| 2007/0040880 A1 | 2/2007 | Jackson et al. | |
| 2007/0146454 A1 * | 6/2007 | Doi et al. | 347/100 |

FOREIGN PATENT DOCUMENTS

| | | |
|---|---|---|
| EP | 1 213 332 A1 | 6/2002 |
| WO | WO 2005/028576 A1 | 3/2005 |
| WO | WO 2007/024834 A1 | 3/2007 |

OTHER PUBLICATIONS

The Color Index, Society Dyers and Colourists, Bradford, Yorkshire, UK, 3rd Edition, 1971 (Book not included).
PCT International Search Report and Written Opinion for International Application No. PCT/US2008/004966 dated Jul. 17, 2008.

* cited by examiner

*Primary Examiner*—Jerry Lorengo
*Assistant Examiner*—Veronica Faison Gee
(74) *Attorney, Agent, or Firm*—Simon L. Xu; Angela J. Grayson

(57) ABSTRACT

The present invention pertains to an aqueous inkjet ink comprising anionic self-dispersing pigment, a certain mixture of alkali metal cations and a certain humectant. The inks exhibit greatly extended latency.

15 Claims, No Drawings

INK JET INK

CROSS-REFERENCE TO RELATED APPLICATION

This application claims priority under 35 U.S.C. §119 from U.S. Provisional Application Ser. No. 60/925,439 (filed Apr. 20, 2007), the disclosure of which is incorporated by reference herein for all purposes as if fully set forth.

BACKGROUND OF THE INVENTION

The present invention pertains to an aqueous-based inkjet ink with pigment colorant and more particularly to an aqueous inkjet ink comprising anionic self-dispersing pigment, a certain mixture of alkali metal cations and a certain humectant. The inks exhibit greatly extended latency.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

An ink-jet ink is characterized by a number of necessary properties, including color, jetability, decap time (latency), drying time and shelf-life, among others. However, there is often a tradeoff between these properties because improving one property can result in the deterioration of another property.

The decap time of the ink is the amount of time a printhead can be left uncapped and idle and still fire a drop properly—that is to say without misdirection, loss of color or unacceptable decrease of velocity. Decap is sometimes referred to in the art as "latency" and these two terms will be used interchangeably.

Because not all the nozzles of the printhead print all the time, a printer service routine requires the idle nozzles to spit on a regular basis into the waste container (spittoon) to avoid printing defects. It is desirable, however, to service the printhead as infrequently as possible as it is wasteful of ink and slows print speeds. To reduce need for servicing, an ink will preferably have a long decap time.

Contributing to decap problems is the trend for printheads to fire smaller drops to increase image resolution. The increased surface area to volume to the smaller drops allows faster evaporation of volatile vehicle components at the nozzle face and thereby tends to decrease decap time.

Both dyes and pigments have been used as colorants for inkjet inks and both have certain advantages. Pigment inks are advantageous because they tend to provide more water-fast and light-fast images than dye inks. Also, with regard to black inks, carbon black pigment can provide much higher optical density than any available dye colorant.

Pigments, in order to be used in inks, must be stabilized to dispersion in the ink vehicle. Stabilization of the pigment can be accomplished by use of separate dispersing agents, such as polymeric dispersants or surfactants. Alternatively, a pigment surface can be chemically modified to with dispersibility-imparting groups and thereby form a so-called "self-dispersible" or "self-dispersing" pigment (hereafter "SDP(s)") which is stable to dispersion without separate dispersant.

SDPs are often advantageous over traditional dispersant-stabilized pigments from the standpoint of greater stability and lower viscosity at the same pigment loading. This can provide greater formulation latitude in final ink.

U.S. Pat. No. 6,069,190 and U.S. Patent Application Publication No. 2007/0040880 disclose inkjet ink formulations with SDP colorant that exhibit improved latency.

U.S. Pat. Nos. 6,328,894; 6,468,342 and 6,852,156 disclose dispersions of anionic SDP with various alkali metal or ammonium counter-ions. Use of these dispersions in inkjet ink is also disclosed.

U.S. Patent Application Publication Nos. 2004/0233263 and 2005/0087105 disclose aqueous inkjet ink formulations comprising Cab-O-Jet® 300 self-dispersing pigment and LiOH or LiCl additive. However, these references do not disclose the present invention.

U.S. Patent Application Publication No. 2005/0032930 discloses inkjet ink comprising anionic SDP with lithium counter-ions and anionic polymer with potassium counter-ions. However, this reference does not disclose the present invention.

U.S. Patent Application Publication No. 2005/0020730 also discloses inkjet ink comprising anionic SDP with lithium counter-ions and polymer, but the counter-ions associated with the polymer are unspecified.

Although current SDP inkjet ink compositions are being successfully jetted, there is still a need in the art for, and it is an object of this invention to provide, SDP inkjet ink with longer decap time that still retains other beneficial print properties.

SUMMARY OF THE INVENTION

In accordance with an objective of this invention, there is provided an ink-jet ink comprising an aqueous vehicle, colorant and a first and second cationic species.

The colorant comprises self-dispersed pigment with anionic dispersibility-imparting surface groups. The first cationic species consists of $Li^+$, and has a molar concentration per unit weight of ink of M1. The second cationic species is any member or combination of members selected from the group consisting of $Na^+$, $K^+$, $Rb^+Cs^+$, and has a molar concentration per unit weight of ink of M2. The molar ratio of M1 to Mtot satisfies equation 1 as follows:

$$0.01 < M1/Mtot < 0.5 \qquad (\text{eq. 1})$$

and Mtot is the cumulative molar concentration of first and second cationic species per unit weight of ink (Mtot=M1+M2).

The aqueous vehicle comprises water and first humectant. The first humectant is selected from any member or combination of members of the group consisting of 2-pyrrolidone, di-(2-hydroxyethyl)-5,5-dimethyl hydantoin, sulfolane, tetramethylene sulfoxide, 1,3-dimethyl-2-imidazolidinone and imidazolidinone.

According to one embodiment of the present invention, the aqueous vehicle further comprises, in addition to the first humectant, a second humectant consisting of ethylene glycol, diethylene glycol, triethylene glycol and mixtures thereof.

The total cation concentration, Mtot, is preferably equal to or greater than the molar concentration per unit weight of ink of the anionic groups on the self-dispersed pigment.

By adjusting the ratio of first and second cationic species, in accordance with the teachings provided herein, greatly enhanced latency can be achieved when compared to inks of similar composition comprising only second cationic species and no first cationic species.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

The inkjet ink of the present invention, as well as inkjet inks in general, are comprised of vehicle, colorant and optionally other ingredients such as surfactants, binders, buffers, biocides and so forth. The ink vehicle is the liquid carrier (or medium) for the colorant and optional additives. The ink colorant refers to any and all species in the ink that provide color. The ink colorant can be a single colored species or a plurality of colored species collectively defining the final ink color. Typical colorants known in the art can be soluble (dye) or insoluble (pigment) in the vehicle.

Vehicle

The term "aqueous vehicle" refers to a vehicle comprised of water and one or more organic, water-soluble vehicle components commonly referred to as co-solvents or humectants. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

Examples of co-solvents that commonly act as penetrants include higher alkyl glycol ethers and/or 1,2-alkanediols. Glycol ethers include, for example, ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediol penetrants include linear, for example, 1,2-($C_5$ to $C_8$)alkanediols and especially 1,2-pentanediol and 1,2-hexanediol.

The aqueous vehicle typically will contain about 65 wt % to about 95 wt % water with the balance (i.e., about 35% to about 5%) being organic water-soluble vehicle components. The amount of aqueous vehicle in the ink is typically in the range of about 75 wt % to about 99.8 wt %.

As prescribed by the present invention, the aqueous vehicle comprises water and first humectant. The first humectant is selected from any member or combination of members of the group consisting of 2-pyrrolidone, di-(2-hydroxyethyl)-5,5-dimethyl hydantoin, sulfolane (also known as tetramethylene sulfone and tetrahydrothiophene-1,1-dioxide), tetramethylene sulfoxide (also known as tetrahydrothiophene oxide), 1,3-dimethyl-2-imidazolidinone and imidazolidinone. The amount of first humectant in the final ink, is generally between about 1 wt % and about 35 wt % and more typically between about 2 wt % and about 30 wt %. In a preferred embodiment, the first humectant is present in the ink at levels in the range of about 4 wt % to about 25 wt %. Even more preferably, the first humectant level is greater than 5 wt %.

In another embodiment, the present invention comprises, in addition to the first humectant, a second humectant selected from any member or combination of members of the group consisting of ethylene glycol, diethylene glycol, triethylene glycol and mixtures thereof. The amount of second humectant, if present at all, is generally between about 1 wt % and about 25 wt % and more typically between about 2 wt % and about 20 wt %. In a preferred embodiment, the second humectant is present in the ink at levels of between about 3 wt % to about 18 wt %.

The percentages of vehicle, co-solvents and humectants herein above is weight percent based on the total weight of ink.

Colorant

Pigments, by definition, are substantially insoluble in an ink vehicle and must be treated in order to form a stable dispersion. An ink according to the present invention comprises self-dispersing pigment ("SDP") colorant which term refers to pigment particles whose surface has been chemically modified with hydrophilic dispersibility-imparting groups that allow stable dispersion in an aqueous vehicle without separate dispersant. More particularly, in the present invention, the hydrophilic dispersibility-imparting surface groups are ionizable, and even more particularly the dispersibility-imparting surface groups are anionic.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle.

Most commonly, the anionic moieties of the dispersibility-imparting groups are carboxylate (also referred to as carboxyl) or sulfonate groups which provide the SDP with a negative charge when dispersed in aqueous vehicle. The carboxylate or sulfonate groups are usually associated with monovalent and/or divalent cationic counter-ions.

Self-dispersing pigments are described, for example, in the following U.S. Pat. Nos. 5,571,311; 5,609,671; 5,968,243; 5,928,419; 6,323,257; 5,554,739; 5,672,198; 5,698,016; 5,718,746; 5,749,950; 5,803,959; 5,837,045; 5,846,307; 5,895,522; 5,922,118; 6,123,759; 6,221,142; 6,221,143; 6,281,267; 6,329,446; 6,332,919; 6,375,317; 6,287,374; 6,398,858; 6,402,825; 6,468,342; 6,503,311; 6,506,245 and 6,852,156.

Commercial sources of SDP include Cabot Corporation, Billerica, Mass., USA; Toyo Ink USA LLC, Addison, Ill., USA; and, Orient Corporation of America, Kenilworth, N.J., USA.

The amount of surface treatment (degree of functionalization) can vary. Advantageous (higher) optical density can be achieved when the degree of functionalization (the amount of hydrophilic groups present on the surface of the SDP per unit surface area) is less than about 3.5 µmoles per square meter of pigment surface (3.5 µmol/m$^2$), more preferably less than about 3.0 µmol/m$^2$. Degrees of functionalization of less than about 1.8 µmol/m$^2$, and even less than about 1.5 µmol/m$^2$, are also suitable and may be preferred for certain specific types of SDPs.

Examples of pigments with coloristic properties useful in inkjet inks include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black. However, some of these pigments may be not be suitable for preparation as SDP and choice of colorant may be dictated by compatibility with a given surface treatment method. Colorants are referred to herein by their "C.I." designation established by Society Dyers and Colorists, Bradford, Yorkshire, UK and published in the *The Color Index*, Third Edition, 1971.

In a preferred embodiment, the anionic functional group(s) on the SDP surface are primarily carboxyl groups, or a combination of carboxyl and hydroxyl groups. Even more preferably the anionic dispersibility-imparting groups are directly attached to the pigment surface and are primarily carboxyl groups, or a combination of carboxyl and hydroxyl.

Preferred SDPs in which anionic dispersibility-imparting groups are directly attached to the pigment surface may be produced, for example, by a method described in U.S. Pat. No. 6,852,156. Carbon black treated by the method described in this publication has a high surface active hydrogen content which is neutralized with base to provide very stable dispersions in water. Application of this method to colored pigments is also possible.

The levels of SDP employed in formulated inks are those levels that are typically needed to impart the desired optical density to the printed image. Typically, SDP levels are in the range of about 0.01 to about 10% by weight of the ink.

The ink colorant prescribed in the present invention must comprise SDP but may additionally comprise other colored species. In a preferred embodiment, the colorant consists essentially of SDP only, which is to say that effectively any and all colored species in the ink are self-dispersing pigments.

Other Ingredients (Additives)

Other ingredients, additives, may be formulated into the inkjet ink, to the extent that such other ingredients do not interfere with the stability and jetablity of the ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in amounts up to about 5% and more typically in amounts of no more than 2%.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N", N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Salts other than the chelators may also be used, for example, to adjust the cation ratio. Biocides may be used to inhibit growth of microorganisms.

Polymers (sometimes referred to as binders) may be added to the ink to improve durability. The polymers can be soluble in the vehicle or dispersed, and can be ionic or nonionic. Anionic polymers, in particular, seem to be advantageous in the adjustment of cation ratios, as noted in the examples herein after.

Preferred anionic polymers are carboxyl groups-containing polymers having carboxylic acid groups (in the acid form or neutralized as "carboxylate") incorporated in the polymer. The polymer may contain other ionic or nonionic hydrophilic groups such as ether, hydroxyl and amide groups.

Soluble polymers may include linear homopolymers, copolymers or block polymers, they also can be structured polymers including graft or branched polymers, stars, dendrimers, etc. The dispersed polymers may include, for example, latexes and hydrosols. The polymers may be made by any known process including but not limited to free radical, group transfer, ionic, RAFT, condensation and other types of polymerization. They may be made by a solution, emulsion, or suspension polymerization process.

The soluble/dispersible carboxyl groups-containing polymer may include copolymers of acrylates, methacrylates, styrene, substituted styrene, α-methylstyrene, substituted α-methyl styrenes, vinyl naphthalenes, vinyl pyrollidones, maleic anhydride, vinyl ethers, vinyl alcohols, vinyl alkyls, vinyl esters, vinyl ester/ethylene copolymers, acrylamides, and methacrylamides. The carboxyl groups-containing polymer may also be a polyester or polyurethane. Preferred classes of polymer additives include anionic acrylic, styrene-acrylic or polyurethane polymer.

A preferred group of carboxyl-groups containing polymers are linear and soluble in the vehicle. Preferably the number average molecular weight ($M_n$) is in the range of 1,000 to 20,000, more preferably 1,000 to 10,000 and most preferably 2,000 to 6,000. In a particularly preferred soluble linear polymer is comprised substantially of monomers of (meth)acrylic acid and/or derivatives thereof, and has a $M_n$ of between about 4000 to about 6000.

When soluble polymer is present, the level is commonly between about 0.01 wt % and about 3 wt %, based on the total weight of ink. Upper limits are dictated by ink viscosity or other physical limitations.

Cations

According to the present invention, an ink will contain a first cationic species ($Li^+$) and a second cationic species (any one or combination of $Na^+$, $K^+$, $Rb^+$ and $Cs^+$). By adjusting the relative ratio of first and second cationic species, as prescribed herein, greatly enhanced decap can be obtained when compared to a similar ink comprising only second cationic species or first cationic species. The increase in decap time is generally at least 50 or 100%, and as shown herein after in the examples, the increase in decap can be more than 10 times that of the same ink comprising only second cationic species and no first cationic species.

The molar concentration of first cationic species per unit weight of ink is referred to as "M1". The molar concentration of second cationic species per unit weight of ink is referred to as "M2". The total alkali metal molar concentration per unit weight of ink (Mtot) is the cumulative molar concentration of first cationic species and second cationic species per unit weight of ink (in other words, Mtot=M1+M2).

The molar content of alkali metal cations present (Mtot) is preferably equal to or greater than the molar content of anionic groups on the self-dispersing pigment per unit weight of ink (referred to a M_anionic). The molar content of anionic groups in the ink is a function of the amount of surface treatment per unit weight of pigment and the amount (weight percent) of self-dispersing pigment in the ink. The presence of "excess" alkali metal cations (Mtot>M_anionic) tends to be advantageous in achieving longer decap.

The first and second cations referred to herein must be in an "available" form, which means they are soluble or at least labile in the vehicle.

The range of ratios of first and second cations yielding best (longest) decap ("optimum ratio") can be fairly narrow. And, the optimum ratio can shift depending on which cations are present, and other factors such as the presence of excess cations and presence of anionic polymer. With the teachings provided herein, one skilled in the art can readily determine appropriate cation levels and ratios.

In general, the optimum M1/Mtot ratio will be between about 0.01 and about 0.5. When the second cationic species is predominately or entirely $K^+$, and substantially no anionic polymer is present in the ink, a preferred ratio of M1 to Mtot is between about 0.01 and about 0.15. When the second cationic species is predominately or entirely $Na^+$, and substantially no anionic polymer is present in the ink, a preferred ratio of M1 to Mtot is between about 0.18 and about 0.5. When the ink also comprises anionic polymer, a preferred ratio of M1 to Mtot is between about 0.2 and about 0.5.

Sodium is prevalent in the environment, and sodium cations may be detectable in an ink (at greater than 1 or 2 parts per million, for example) even when not deliberately added. The levels of other alkali metals, however, are typically nil (e.g. less than about 1 or 2 ppm) without deliberate addition.

The cations present in the pigmented inks can be measured, by standard methods such as ion chromatography with a cation-exchange column (for example, a CS12A column from Dionex Corp., Sunnyvale, Calif.), and inductively coupled plasma optical emission spectroscopy (ICP/OES) with, for example, a commercially available instrument such as a PE Optima (Perkin Elmer Life and Analytical Sciences, Shelton, Conn.).

Prior to analysis, the pigment is removed from the ink by precipitating with the addition of hydrochloric acid. The precipitated pigment is separated by ultracentrifugation and the resulting clear supernatant is analyzed for cations.

Ink Properties

Jet velocity, separation length of the droplets, drop size and stream stability are greatly affected by the surface tension and the viscosity of the ink. Pigmented ink jet inks typically have a surface tension in the range of about 20 $mN \cdot m^{-1}$ to about 70 $mN \cdot m^{-1}$ at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inventive ink is particularly suited to lower viscosity applications. Thus the viscosity (at 25° C.) of the inventive ink can be less than about 7 mPa·s, or less than about 5 mPa·s and even, advantageously, less than about 3.5 mPa·s. Thermal inkjet actuators rely on instantaneous heating/bubble formation to eject ink drops and this mechanism of drop formation generally requires inks of lower viscosity. As such, the instant ink can be particularly advantages in thermal printheads.

Substrate

The substrate can be any suitable substrate including plain paper, such as common electrophotographic copier paper; treated paper, such as photo-quality inkjet paper; textile; and, non-porous substrates including polymeric films such as polyvinyl chloride and polyester.

The following examples illustrate the invention without, however, being limited thereto.

EXAMPLES

Inks in the examples that follow were prepared by adding the indicated formulation ingredients to the dispersion(s), with mixing, and filtering through a 2.5 micron filter to remove any oversize material. The water was deionized unless otherwise stated. Ingredient amounts are in weight percent of the total weight of ink. Surfynol® 465 is a surfactant from Air Products (Allentown, Pa., USA). Dantocol® DHE is di-(2-hydroxyethyl)-5,5-dimethylhydantoin (CAS No. 26850-24-8) from Lonza, Inc. (Allendale, N.J., USA).

Dispersion 1

Carbon black (Nippex 180 from Degussa, surface area about 260 $m^2/g$) was oxidized with ozone, according to the process described in U.S. Pat. No. 6,852,156, to create carboxylic acid groups directly attached to the surface. Potassium hydroxide was used during processing to neutralize the treated pigment and convert the surface acid groups to the salt form. The neutralized mixture was purified by ultra-filtration to remove free acids, salts, and contaminants. The purification process was performed to repeatedly wash pigment with de-ionized water until the conductivity of the mixture leveled off and remained relatively constant.

After recovery, a 12.8 weight percent dispersion of the self-dispersing carbon black pigment (potassium salt form) was obtained with a viscosity of 3.5 mPa·s (25° C.). The median particle size was about 98 nm.

Dispersion 2

Dispersion 2 was similar to Dispersion 1 except that the starting pigment was S160 from Degussa (surface area is 150 $m^2/g$) and lithium hydroxide was used as the neutralizing agent to provide the SDP in lithium salt form. The median particle size was about 110 nm.

Dispersion 3

Dispersion 3 was Cabojet® 300 (a self-dispersing carbon black pigment from Cabot Corporation) dispersed in water at about 15 weight percent concentration. This is a graft-type SDP with carboxyl groups grafted to the pigment surface through a spacer group. The cationic counter ion was Sodium.

Dispersion 4

Dispersion 4 is the ammonium salt form of Dispersion 1 and was prepared by subjecting Dispersion 1 to ion exchanged to replace $K^+$ with $NH_4^+$.

Dispersion 5

Dispersion 5 is the sodium salt form of Dispersion 1 and was prepared by subjecting Dispersion 1 to ion exchanged to replace $K^+$ with $Na^+$.

Binder 1 (Polymer Additive)

Binder 1 was a block copolymer with methacrylic acid//benzyl methacrylate//ethyltriethyleneglycol methacrylate (13//15//14) prepared in a manner similar to "preparation 4" described in U.S. Pat. No. 5,519,085, except the monomer levels were adjusted to give the ratio indicated. The neutralizing agent was lithium hydroxide providing the lithium salt form of the polymer. The number average molecular weight was about 5,000 and weight average molecular weight was about 6,000 g/mol.

Binder 2 (Polymer Additive)

Binder 2 was a block copolymer similar to Binder 1 except that the neutralizing agent was potassium hydroxide to provide the potassium salt form of the polymer.

Optical Density

Inks were printed with a Canon i560 printer onto HP office, Xerox 4024 and Hammermill Copy Plus plain papers. The reported optical density (OD) values were of areas printed at 100% coverage, measured with a Greytag Macbeth Spectrolino spectrometer.

Cation Analytical Method

Prior to analysis, the pigment was removed from the ink by precipitation with added hydrochloric acid. The precipitated pigment was separated by ultracentrifugation and the resulting clear supernatant was analyzed for the cations by inductively coupled plasma optical emission spectroscopy (ICP/OES) using PE Optima instrumentation (Perkin Elmer Life and Analytical Sciences, Shelton, Conn.).

This ICP method was able to detect the lithium, sodium, potassium and rubidium with a sensitivity of about 2 ppm. Cesium was not detected accurately and reported concentrations were calculated based on the formulation. Ammonium concentrations were also calculated based on the formulation as ICP is suitable only for the metallic ions.

Cation levels are reported in two ways, on a weight basis as parts per million (ppm) cation in total ink and on a molar basis as micromoles ($\mu$mol) of cation per gram of SDP (g-SDP). A micromole is $10^{-6}$ moles. The calculation for $\mu$mol of cation per g-SDP is (100)(cation ppm)/(wt % SDP)(cation molecular weight).

From the given weight percent of SDP in the inks, $\mu$mol of cation per g-SDP can be converted to moles of cation per unit weight of ink (units specified in the claims). However, for purposes of calculating the molar ratio M1/Mtot, conversion is unnecessary as the units cancel and the ratio is the same.

Latency Test

Latency (decap time) was determined according to the following procedure using a Hewlett Packard 850 printer that was altered so that the ink cartridge would not be serviced during the test. Just prior to the beginning of the test, the nozzles were primed and a nozzle check pattern was performed to ensure all nozzles were firing acceptably. No further servicing was then conducted During each scan across the page, the pen prints a pattern of 149 vertical lines spaced about 1/16 inch apart. Each vertical line is formed by all nozzles firing one drop, therefore the line is one drop wide and about ½ inch high corresponding to the length of the nozzle array on the printhead. The first vertical line in each scan is the first drop fired from each nozzle after the prescribed latency period, the fifth line was the fifth drop from each nozzle on that scan, and so forth for all 149 lines.

The pattern was repeated at increasingly longer time intervals (decap times) between scans. The standard time intervals between scans was 1, 2, 3, 4, 5, 6, 7, 8, 9, 10, 20, 30, 40, 50, 60, 70, 80, 90 100, 200, 300, 400, 500, 600, 700, 800, 900, and 1000 seconds. Nothing beyond 1000 seconds was attempted.

Upon completion of the test, the $1^{st}$, $5^{th}$, and $32^{nd}$ vertical lines in each scan was examined for consistency, misdirected drop deposits, and clarity of the print. These lines correspond to the $1^{st}$, $5^{th}$ and $32^{nd}$ drops of ink droplets ejected from the nozzle after a prescribed latency period. The decap time was the longest time interval where the particular vertical line can be printed without significant defects.

Preferably, the pen will fire properly on the first drop. However, when the first drop fails to eject properly, the decap time for the fifth and thirty-second drops can provide some information as to the severity of the pluggage and how easily the nozzles can be recovered.

The results tables hereinafter report only the first drop decap time and refer to the value simply as the "Decap Time" in units of seconds.

Example 1

The inks of this example, summarized in the tables that follow, demonstrate the benefits of a mixture of lithium and potassium cations. The Mtot is the molar amount of all alkali metal cations present in the ink, per unit weight of SDP (in other words, Mtot=M1+M2).

Inks 1B-1E combine different ratios of a lithium neutralized SDP dispersion and a potassium neutralized SDP dispersion. In these inks there was effectively no "extra" cations; all the cations present are associated with the carboxyl groups in the neutralized SDP dispersions. It can be seen that the mixed cations provide better (longer) decap than the control samples with the separate cations.

Also seen in this and other examples are background levels of sodium present even when sodium species were not deliberately added.

|  | Ink 1A Control | Ink 1B | Ink 1C | Ink 1D | Ink 1E | Ink 1F Control |
|---|---|---|---|---|---|---|
| Ink Formulation |  |  |  |  |  |  |
| Dispersion 1 (as % pigment) | 3.5 | 3.0 | 2.5 | 2.0 | 1.5 | — |
| Dispersion 2 (as % pigment) | — | 0.5 | 1.0 | 1.5 | 2.0 | 3.5 |
| 2-pyrrolidinone | 10.0 | 10.0 | 10.0 | 10.0 | 10.0 | 10.0 |
| Diethylene glycol | 10.0 | 10.0 | 10.0 | 10.0 | 10.0 | 10.0 |
| Surfynol 465 | 0.2 | 0.2 | 0.2 | 0.2 | 0.2 | 0.2 |
| Water (balance to 100%) | Bal. | Bal. | Bal. | Bal. | Bal. | Bal. |

-continued

|  | Ink 1A Control | Ink 1B | Ink 1C | Ink 1D | Ink 1E | Ink 1F Control |
|---|---|---|---|---|---|---|
| Physical Properties | | | | | | |
| Conductivity (mS/cm) | 0.19 | 0.18 | 0.17 | 0.17 | 0.16 | 0.16 |
| pH | 6.63 | 6.65 | 6.30 | 6.61 | 6.65 | 7.22 |

|  | Ink 1A Control | Ink 1B | Ink 1C | Ink 1D | Ink 1E | Ink 1F Control |
|---|---|---|---|---|---|---|
| Print Properties | | | | | | |
| Decap Time (sec.) | 90 | 500 | 600 | 400 | 10 | 5 |
| OD Hammermill | 1.30 | 1.27 | 1.30 | 1.31 | 1.33 | 1.35 |
| OD HP Office | 1.33 | 1.35 | 1.31 | 1.29 | 1.33 | 1.34 |
| OD Xerox 4024 | 1.28 | 1.29 | 1.29 | 1.27 | 1.30 | 1.33 |
| Cation Content | | | | | | |
| Lithium ($\mu$mol/g-SDP) | — | 41 | 84 | 124 | 166 | 309 |
| Sodium ($\mu$mol/g-SDP) | 26 | 26 | 27 | 24 | 25 | 22 |
| Potassium ($\mu$mol/g-SDP) | 320 | 277 | 233 | 185 | 140 | — |
| Mtot ($\mu$mol/g) | 346 | 344 | 344 | 333 | 331 | 331 |
| Ratio (%) M1/Mtot | — | 12 | 24 | 37 | 50 | 91 |

Inks 1G-1K adjust the M1/Mtot ratio by adding lithium acetate to a potassium neutralized dispersion. Thus there is "excess" cation relative to the neutralized SDP and it appears that an excess of cations is beneficial as the decap at the optimum ratios is better than in the inks without excess cations.

|  | Ink 1G | Ink 1H | Ink 1I | Ink 1J | Ink 1K |
|---|---|---|---|---|---|
| Ingredients | | | | | |
| Dispersion 1 (as % pigment) | 3.5 | 3.5 | 3.5 | 3.5 | 3.5 |
| Lithium acetate | 0.0025 | 0.005 | 0.01 | 0.015 | 0.02 |
| Diethylene glycol | 10 | 10 | 10 | 10 | 10 |
| 2-pyrrolidone | 10 | 10 | 10 | 10 | 10 |
| Surfynol 465 | 0.2 | 0.2 | 0.2 | 0.2 | 0.2 |
| Water (balance to 100%) | Bal. | Bal. | Bal. | Bal. | Bal. |
| Physical Properties | | | | | |
| Conductivity (mS/cm) | 0.346 | 0.28 | 0.39 | 0.66 | 0.93 |
| pH | 6.5 | 6.67 | 6.52 | 6.38 | 6.34 |

|  | Ink 1G | Ink 1H | Ink 1I | Ink 1J | Ink 1K |
|---|---|---|---|---|---|
| Print Properties | | | | | |
| Decap Time (sec.) | 200 | >1,000 | 800 | 10 | 10 |
| OD Hammermill | 1.35 | 1.31 | 1.31 | 1.29 | 1.30 |
| OD HP Office | 1.30 | 1.22 | 1.30 | 1.27 | 1.26 |
| OD Xerox 4024 | 1.28 | 1.22 | 1.30 | 1.27 | 1.24 |
| Cation Content | | | | | |
| Lithium ($\mu$mol/g-SDP) | 13 | 29 | 65 | 98 | 135 |
| Sodium ($\mu$mol/g-SDP) | 11 | 11 | 7 | 7 | 7 |
| Potassium ($\mu$mol/g-SDP) | 331 | 319 | 323 | 315 | 314 |
| Mtot ($\mu$mol/g-SDP) | 350 | 359 | 396 | 420 | 456 |
| Ratio (%) M1/Mtot | 3.7 | 8.1 | 16.5 | 23.3 | 29.6 |

Inks 1L-1N adjust the M1/Mtot ratio by adding potassium hydroxide to a lithium neutralized dispersion. Conductivity is especially high as substantial amount of potassium must be added to achieve the desired cation ratio.

|  | Ink 1L | Ink 1M | Ink 1N |
|---|---|---|---|
| Ingredients | | | |
| Dispersion 2 (as % pigment) | 3.5 | 3.5 | 3.5 |
| Potassium hydroxide | 0.1 | 0.2 | 0.5 |
| Diethylene glycol | 10 | 10 | 10 |
| 2-pyrrolidone | 10 | 10 | 10 |
| Surfynol 465 | 0.2 | 0.2 | 0.2 |
| Water (to 100%) | Balance | Balance | Balance |
| Physical Properties | | | |
| Conductivity (mS/cm) | 1.03 | 1.98 | 10.55 |
| pH | 11.87 | 11.91 | 12.71 |

|  | Ink 1L | Ink 1M | Ink 1N |
|---|---|---|---|
| Print Properties | | | |
| Decap Time (sec.) | 300 | >1,000 | >1,000 |
| OD Hammermill | 1.33 | 1.36 | 1.34 |
| OD HP Office | 1.25 | 1.31 | 1.30 |
| OD Xerox 4024 | 1.20 | 1.27 | 1.24 |
| Cation Content | | | |
| Lithium ($\mu$mol/g-SDP) | 252 | 264 | 276 |
| Sodium ($\mu$mol/g-SDP) | 1 | 12 | 13 |
| Potassium ($\mu$mol/g-SDP) | 591 | 1019 | 2978 |
| Mtot ($\mu$mol/g-SDP) | 844 | 1295 | 3267 |
| Ratio (%) M1/Mtot | 30 | 20 | 8.4 |

Cation analysis of the inks in this example is summarized in the following table.

| Ink | Li (ppm) | Na (ppm) | K (ppm) |
|---|---|---|---|
| Ink 1A | 0 | 21 | 436 |
| Ink 1B | 10 | 21 | 379 |
| Ink 1C | 21 | 21 | 318 |
| Ink 1D | 30 | 19 | 252 |
| Ink 1E | 41 | 20 | 191 |
| Ink 1F | 76 | 18 | 9 |
| Ink 1G | 4 | 9 | 450 |
| Ink 1H | 0 | 6 | 456 |
| Ink 1I | 8 | 6 | 430 |
| Ink 1J | 16 | 6 | 441 |

-continued

| Ink | Li (ppm) | Na (ppm) | K (ppm) |
|---|---|---|---|
| Ink 1K | 25 | 7 | 430 |
| Ink 1L | 67 | 8 | 808 |
| Ink 1M | 64 | 10 | 1393 |
| Ink 1N | 61 | 11 | 4071 |

Example 2

Inks in this example, summarized in the table that follows, demonstrate lithium with a second cation consisting of sodium only. Ink 2a is a control with sodium but no lithium. Ink 2B adjusts the M1/Mtot ratio by employing a lithium neutralized dispersion in combination with a sodium neutralized dispersion (no extra cations). Inks 2C-2E adjust the M1/Mtot ratio by adding lithium acetate to a sodium-neutralized dispersion.

Results show that Ink 2B with mixed dispersions has a better decap than the same ink with only sodium dispersion (Control 2A) or with only lithium dispersion (Control 1F in the previous example). Also, the M1/Mtot ratio can be adjusted by adding "excess cations in the form of salt. As in the preceding example, it appears that an excess of cations is beneficial to achieving better decap than when just a minimum level of alkali metal cations is present.

|  | Ink 2A Control | Ink 2B | Ink 2C | Ink 2D | Ink 2E |
|---|---|---|---|---|---|
| Ingredients |  |  |  |  |  |
| Dispersion 3 (as % pigment) | 3.5 | 2.5 | 3.5 | 3.5 | 3.5 |
| Dispersion 2 (as % pigment) | — | 1.0 | — | — | — |
| Lithium Acetate | — | — | 0.01 | 0.02 | 0.03 |
| Diethylene glycol | 10 | 10 | 10 | 10 | 10 |
| 2-pyrrolidone | 10 | 10 | 10 | 10 | 10 |
| Surfynol 465 | 0.2 | 0.2 | 0.2 | 0.2 | 0.2 |
| Water (to 100%) | Bal. | Bal. | Bal. | Bal. | Bal. |
| Physical Properties |  |  |  |  |  |
| Conductivity (mS/cm) | 0.24 | 0.17 | 0.25 | 0.32 | 0.36 |
| pH | 7.9 | 7.7 | 7.8 | 7.7 | 7.7 |

|  | Ink 2A Control | Ink 2B | Ink 2C | Ink 2D | Ink 2E |
|---|---|---|---|---|---|
| Print Properties |  |  |  |  |  |
| Decap Time (sec.) | 200 | 600 | 200 | >1000 | 500 |
| OD Hammermill | 1.13 | 1.23 | 1.16 | 1.19 | 1.19 |
| OD HP Office | 1.00 | 1.15 | 1.20 | 1.20 | 1.02 |
| OD Xerox 4024 | 0.93 | 0.97 | 1.00 | 1.00 | 0.93 |
| Ion Content |  |  |  |  |  |
| Lithium (μmol/g-SDP) | — | 82 | (43) | (86) | (107) |
| Sodium (μmol/g-SDP) | 280 | 200 | (280) | (280) | (280) |
| Potassium (μmol/g-SDP) | — | — | — | — | — |
| Mtot (μmol/g-SDP) | 280 | 282 | 326 | 366 | 387 |
| Ratio (%) M1/Mtot | — | 29.1 | 13 | 23 | 28 |

Cation analysis of the inks in this example is summarized in the following table. The cation levels shown in parentheses for Inks 2C, 2D and 2E were calculated values based on formulation.

| Ink | Li (ppm) | Na (ppm) | K (ppm) |
|---|---|---|---|
| Ink 2A | 0 | 225 | 0 |
| Ink 2B | 20 | 161 | 0 |
| Ink 2C | (11) | (225) | 0 |
| Ink 2D | (22) | (225) | 0 |
| Ink 2E | (28) | (225) | 0 |

Example 3

Inks in this example, summarized in the table that follows, demonstrate use of rubidium (Ink 3C) or cesium (ink 3D) as the second cation. Results again show improved decap. Combinations of K/Rb (Control Ink 3A) or K/Cs (control Ink 3B), without lithium, do not achieve advantageous decap. The cesium levels shown in parentheses in Inks 3B and 3D were calculated values based on formulation.

|  | Ink 3A Control | Ink 3B Control | Ink 3C | Ink 3D |
|---|---|---|---|---|
| Ingredient |  |  |  |  |
| Dispersion 1 (as % pigment) | 3.5 | 3.5 | — | — |
| Dispersion 2 (as % pigment) | — | — | 3.5 | 3.5 |
| Rubidium acetate | 0.011 | — | 1.3 | — |
| Cesium acetate | — | — | — | 1.0 |
| Cesium carbonate | — | 0.01 | — | — |
| Diethylene glycol | 10 | 10 | 10 | 10 |
| 2-pyrrolidone | 10 | 10 | 10 | 10 |
| Surfynol 465 | 0.2 | 0.2 | 0.2 | 0.2 |
| Water (balance to 100%) | Balance | Balance | Balance | Balance |
| Physical Properties |  |  |  |  |
| Conductivity (mS/cm) | 0.21 | 0.16 | 4.95 | 3.07 |
| pH | 7.14 | 7.01 | 6.55 | 6.42 |

|  | Ink 3A | Ink 3B | Ink 3C | Ink 3D |
|---|---|---|---|---|
| Print Properties |  |  |  |  |
| Decap Time (sec.) | 100 | 200 | >1,000 | 500 |
| OD Hammermill | 1.33 | 1.31 | 1.35 | 1.36 |
| OD HP Office | 1.27 | 1.24 | 1.33 | 1.36 |
| OD Xerox 4024 | 1.28 | 1.24 | 1.30 | 1.15 |
| Ion Content |  |  |  |  |
| Lithium (µmol/g) | — | — | 294 | 294 |
| Potassium (µmol/g-SDP) | 385 | 385 | — | — |
| Rubidium (µmol/g-SDP) | 22 | — | 2426 | — |
| Cesium (µmol/g-SDP) | — | (9) | — | (1488) |
| Mtot (µmol/g-SDP) | 407 | 394 | 2720 | 1782 |
| Ratio (%) M1/Mtot | 0 | 0 | 9.2 | 6.1 |

Example 4

Inks in this example, summarized in the tables that follow, include anionic polymer in the formulation. Inks 4A-4D achieve a M1/Mtot ratio by combination of a potassium neutralized dispersion with a lithium neutralized anionic polymer binder additive.

|  | Ink 4A | Ink 4B | Ink 4C | Ink 4D |
|---|---|---|---|---|
| Ingredients |  |  |  |  |
| Dispersion 1 (as % pigment) | 3.5 | 3.5 | 3.5 | 3.5 |
| Binder 1 (as % polymer) | 0.05 | 0.1 | 0.25 | 0.5 |
| 2-pyrrolidone | 10.0 | 10.0 | 10.0 | 10.0 |
| Diethylene glycol | 10.0 | 10.0 | 10.0 | 10.0 |
| Surfynol 465 | 0.2 | 0.2 | 0.2 | 0.2 |
| Water (balance to 100%) | Bal. | Bal. | Bal. | Bal. |
| Physical Properties |  |  |  |  |
| Conductivity (mS/cm) | 0.20 | 0.21 | 0.26 | 0.33 |
| pH | 6.98 | 6.98 | 7.20 | 7.60 |

|  | Ink 4A | Ink 4B | Ink 4C | Ink 4D |
|---|---|---|---|---|
| Print Properties |  |  |  |  |
| Decap Time (sec.) | >1,000 | >1,000 | 40 | 10 |
| OD Hammermill | 1.32 | 1.31 | 1.24 | 1.20 |
| OD HP Office | 1.30 | 1.29 | 1.17 | 1.08 |
| OD Xerox 4024 | 1.23 | 1.25 | 1.18 | 1.11 |
| Ion Content |  |  |  |  |
| Lithium (µmol/g-SDP) | 43 | 55 | 142 | 270 |
| Sodium (µmol/g-SDP) | 13 | 12 | 11 | 11 |
| Potassium (µmol/g-SDP) | 331 | 325 | 322 | 322 |
| Mtot (µmol/g-SDP) | 387 | 392 | 475 | 603 |
| Ratio (%) M1/Mtot | 11 | 14 | 30 | 45 |

Inks 4E-4H achieve the M1/Mtot ratio by combination of a lithium neutralized dispersion with a potassium neutralized anionic polymer. In this case, high levels of polymer are needed to add enough potassium for the proper M1/Mtot ratios.

|  | Ink 4E | Ink 4F | Ink 4G | Ink 4H |
|---|---|---|---|---|
| Ingredients |  |  |  |  |
| Dispersion 2 (as % pigment) | 3.5 | 3.5 | 3.5 | 3.5 |
| Binder 2 (as % polymer) | 0.15 | 0.25 | 0.50 | 0.75 |
| 2-pyrrolidone | 10.0 | 10.0 | 10.0 | 10.0 |
| Diethylene glycol | 10.0 | 10.0 | 10.0 | 10.0 |
| Surfynol 465 | 0.2 | 0.2 | 0.2 | 0.2 |
| Water (balance to 100%) | Balance | Balance | Balance | Balance |
| Physical Properties |  |  |  |  |
| Conductivity (mS/cm) | 0.22 | 0.27 | 0.38 | 0.55 |
| pH | 7.40 | 7.32 | 7.89 | 7.66 |

|  | Ink 4E | Ink 4F | Ink 4G | Ink 4H |
|---|---|---|---|---|
| Print Properties |  |  |  |  |
| Decap Time (sec.) | 10 | 300 | >1,000 | >1,000 |
| OD Hammermill | 1.30 | 1.35 | 1.28 | 1.31 |
| OD HP Office | 1.29 | 1.33 | 1.23 | 1.30 |
| OD Xerox 4024 | 1.22 | 1.22 | 1.17 | 1.17 |
| Ion Content |  |  |  |  |
| Lithium (µmol/g-SDP) | 280 | 290 | 285 | 285 |
| Sodium (µmol/g-SDP) | 12 | 16 | 12 | 22 |
| Potassium (µmol/g-SDP) | 150 | 231 | 460 | 694 |
| Mtot (µmol/g-SDP) | 442 | 537 | 757 | 1001 |
| Ratio (%) M1/Mtot | 63 | 54 | 38 | 28 |

It appears that the presence of polymer can impart a broader operating window of cation ratios, M1/Mtot, where very long decap is achieved. This can be advantageous in commercial production.

Cation analysis of the inks in this example is summarized in the following table.

| Ink | K (ppm) | Li (ppm) | Na (ppm) |
|---|---|---|---|
| Ink 4A | 452 | 10 | 10 |
| Ink 4B | 445 | 13 | 10 |
| Ink 4C | 440 | 35 | 9 |
| Ink 4D | 440 | 67 | 9 |
| Ink 4E | 205 | 68 | 10 |
| Ink 4F | 317 | 70 | 13 |
| Ink 4G | 632 | 69 | 10 |
| Ink 4H | 950 | 69 | 18 |

Example 5

Inks of this example, summarized in the tables that follow, demonstrate use of different humectants and levels thereof. As shown, all of the formulations benefit from the mixture of cations to achieve a longer decap time than would have been obtained with a single cationic species only. For comparison, Control ink 1A ink in Example 1, comprising Dispersion 1 (potassium) only, had a decap of 90 seconds. Control Ink 1F in Example 1, comprising Dispersion 2 (lithium) only, had a decap time of 5 seconds.

The presence of the prescribed first humectant, especially at levels greater than about 5 wt %, is particularly advantageous for achieving long decap.

|  | Ink 5A Control | Ink 5B | Ink 5C | Ink 5D |
|---|---|---|---|---|
| Ingredients |  |  |  |  |
| Dispersion 1 (as % pigment) | 2.5 | 2.5 | 2.5 | 2.5 |
| Dispersion 2 (as % pigment) | 1.0 | 1.05 | 1.0 | 1.0 |
| 2-pyrrolidinone | — | 5.0 | 15.0 | 20.0 |
| Diethylene glycol | 20.0 | 15.0 | 5.0 | — |
| Surfynol 465 | 0.2 | 0.2 | 0.2 | 0.2 |
| Water (balance to 100%) | Balance | Balance | Balance | Balance |
| Physical Properties |  |  |  |  |
| Conductivity (mS/cm) | 0.18 | 0.17 | 0.16 | 0.15 |
| pH | 6.25 | 6.40 | 6.76 | 6.87 |

| Print Properties | Ink 5A | Ink 5B | Ink 5C | Ink 5D |
|---|---|---|---|---|
| Decap Time (sec.) | 400 | 400 | >1,000 | >1,000 |
| OD Hammermill | 1.37 | 1.31 | 1.31 | 1.28 |
| OD HP Office | 1.35 | 1.30 | 1.28 | 1.27 |
| OD Xerox 4024 | 1.30 | 1.26 | 1.26 | 1.24 |

|  | Ink 5E | Ink 5F | Ink 5G | Ink 5H |
|---|---|---|---|---|
| Ingredients |  |  |  |  |
| Dispersion 1 (as % pigment) | 3.5 | 3.5 | 3.5 | 3.5 |
| Lithium acetate | 0.006 | 0.006 | 0.006 | 0.006 |
| Potassium acetate | — | 0.02 | — | — |
| Sulfolane | 10.0 | 10.0 | — | — |
| Dantocol DHE | — | — | 10.0 | 5.0 |
| 2-pyrrolidinone | — | — | — | 5.0 |
| Diethylene glycol | 10.0 | 10.0 | 10.0 | 10.0 |
| Surfynol 465 | 0.2 | 0.2 | 0.2 | 0.2 |
| Water (balance to 100%) | Bal. | Bal. | Bal. | Bal. |
| Physical Properties |  |  |  |  |
| Conductivity (mS/cm) | 0.337 | 0.472 | 0.626 | 0.475 |
| pH | 6.13 | 6.04 | 5.82 | 5.98 |

| Print Properties | Ink 5E | Ink 5F | Ink 5G | Ink 5H |
|---|---|---|---|---|
| Decap Time (sec.) | 300 | 500 | >1,000 | >1000 |
| OD Hammermill | 1.30 | 1.31 | 1.29 | 1.31 |
| OD HP Office | 1.32 | 1.33 | 1.34 | 1.35 |
| OD Xerox 4024 | 1.28 | 1.29 | 1.36 | 1.32 |

|  | Ink 5I | Ink 5J | Ink 5K | Ink 5L |
|---|---|---|---|---|
| Ingredients |  |  |  |  |
| Dispersion 1 (as % pigment) | 3.5 | 3.5 | 3.5 | 3.5 |
| Lithium acetate | 0.005 | 0.006 | 0.006 | 0.006 |
| Sulfolane | 10.0 | — | — | — |
| Tetramethylene sulfoxide | — | 10.0 | — | — |
| 1,3-dimethyl-2-imidazolidinone | — | — | 10.0 | — |
| Imidazolidinone | — | — | — | 10.0 |
| Diethylene glycol | 10.0 | 10.0 | 10.0 | 10.0 |
| Surfynol 465 | 0.2 | 0.2 | 0.2 | 0.2 |
| Water (balance to 100%) | Bal. | Bal. | Bal. | Bal. |
| Physical Properties |  |  |  |  |
| Conductivity (mS/cm) | 0.24 | 0.22 | 0.22 | 0.24 |
| pH | 6.54 | 6.52 | 6.45 | 6.62 |

| Print Properties | Ink 5I | Ink 5J | Ink 5K | Ink 5L |
|---|---|---|---|---|
| Decap Time (sec.) | >1,000 | >1,000 | 600 | >1,000 |
| OD Hammermill | 1.37 | 1.41 | 1.35 | 1.41 |
| OD HP Office | 1.43 | 1.43 | 1.39 | 1.36 |
| OD Xerox 4024 | 1.38 | 1.4 | 1.37 | 1.39 |

Example 6

Inks 6A-6C, summarized in the table that follows, demonstrate the addition of ammonium salts to a lithium/potassium cation mixture. It appears that Li and ammonium may act in cooperation as a first cation because the decap obtained for Ink 6a is somewhat longer than expected for the low lithium content (compared to Ink 1G, for example), and the decap for Ink 6B is somewhat lower than expected for the given lithium content (compared to Ink 1H, for example).

The ammonium levels shown in parentheses were calculated values based on formulation.

|  | Ink 6A | Ink 6B | Ink 6C |
|---|---|---|---|
| Ingredients |  |  |  |
| Dispersion1 (as % pigment) | 3.5 | 3.5 | 3.5 |
| Lithium acetate | 0.0025 | 0.005 | 0.01 |
| Ammonium acetate | 0.005 | 0.01 | 0.02 |
| Diethylene glycol | 10 | 10 | 10 |
| 2-pyrrolidone | 10 | 10 | 10 |
| Surfynol 465 | 0.2 | 0.2 | 0.2 |
| Water (balance to 100%) | Balance | Balance | Balance |
| Physical Properties |  |  |  |
| Conductivity (mS/cm) | 0.31 | 0.35 | 0.45 |
| pH | 6.46 | 6.26 | 6.23 |

|  | Ink 6A | Ink 6B | Ink 6C |
|---|---|---|---|
| Print Properties |  |  |  |
| Decap Time (sec.) | >1,000 | 800 | 500 |
| OD Hammermill | 1.32 | 1.33 | 1.30 |
| OD HP Office | 1.35 | 1.33 | 1.34 |
| OD Xerox 4024 | 1.30 | 1.33 | 1.30 |
| Ion Content |  |  |  |
| Lithium (µmol/g-SDP) | 17 | 31 | 50 |
| Ammonium (µmol/g-SDP) | (18) | (37) | (74) |
| Sodium (µmol/g-SDP) | 12 | 13 | 13 |
| Potassium (µmol/g-SDP) | 328 | 323 | 321 |
| Mtot (µmol/g-SDP) | 375 | 404 | 458 |
| Ratio (%) M1/Mtot | 4.5 | 7.7 | 11 |

Inks 6D and 6E, summarized in the table that follows, demonstrate addition of sodium cation (as hydroxide) to a lithium/potassium cation mixture. The combination of cations in Ink 6E gives very long decap that is not achieved by the same level of lithium without the additional sodium (Ink 1G).

|  | Ink 6D | Ink 6E |
| --- | --- | --- |
| Ingredients |  |  |
| Dispersion 1 (as % pigment) | 3.5 | 3.5 |
| Lithium acetate | 0.0025 | 0.015 |
| Sodium hydroxide | 0.010 | 0.010 |
| Diethylene glycol | 10 | 10 |
| 2-pyrrolidone | 10 | 10 |
| Surfynol 465 | 0.2 | 0.2 |
| Water (to 100%) | Bal. | Bal. |
| Physical Properties |  |  |
| Conductivity (mS/cm) | 0.260 | 0.350 |
| pH | 7.2 | 7.0 |

|  | Ink 6D | Ink 6E |
| --- | --- | --- |
| Print Properties |  |  |
| Decap Time (sec.) | >1,000 | 600 |
| OD Hammermill | 1.28 | 1.28 |
| OD HP Office | 1.26 | 1.26 |
| OD Xerox 4024 | 1.29 | 1.31 |
| Cation Content |  |  |
| Lithium (µmol/g-SDP) | 14 | 73 |
| Sodium (µmol/g-SDP) | 114 | 108 |
| Potassium (µmol/g-SDP) | 335 | 328 |
| Mtot (µmol/g-SDP) | 463 | 509 |
| Ratio (%) M1/Mtot | 3.0 | 14.3 |

Cation analysis of the inks in this example is summarized in the following table.

| Ink | K (ppm) | Li (ppm) | Na (ppm) |
| --- | --- | --- | --- |
| Ink 6A | 449 | 4 | 10 |
| Ink 6B | 442 | 8 | 10 |
| Ink 6C | 439 | 12 | 10 |
| Ink 6D | 447 | 3 | 92 |
| Ink 6E | 438 | 18 | 87 |

The invention claimed is:

1. An inkjet ink comprising an aqueous vehicle, a colorant, and a first and second cationic species wherein:
   i) said aqueous vehicle comprises water and a first humectant wherein said first humectant is any member or combination of members selected from the group consisting of 2-pyrrolidone, di-(2-hydroxyethyl)-5,5-dimethyl hydantoin, sulfolane, tetramethylene sulfoxide, 1,3-dimethyl-2-imidazolidinone and imidazolidinone;
   ii) said colorant comprises self-dispersed pigment with anionic carboxylate dispersibility-imparting surface groups;
   iii) said first cationic species is $Li^+$, and has a molar concentration per unit weight of ink of M1;
   iv) said second cationic species is any member or combination of members selected from the group consisting of $Na^+$, $K^+$, $Rb^+$ and $Cs^+$, and has a molar concentration per unit weight of ink of M2; and
   v) the molar ratio of M1 to Mtot, satisfies Equation 1 as follows:

$$0.01 \leq M1/Mtot \leq 0.5 \tag{Eq. 1}$$

wherein Mtot is the cumulative molar concentration of first and second cationic species per unit weight of ink (Mtot=M1+M2).

2. The ink of claim 1 further comprising a second humectant selected from any member or combinations of member of the group consisting of ethylene glycol, diethylene glycol and triethylene glycol.

3. The inkjet ink of claim 1 wherein the molar concentration of said anionic dispersibility-imparting surface groups on the self dispersing pigment per unit weight of ink is M_anionic and Mtot is equal to or greater than said M_anionic.

4. An ink according to claim 3 wherein the second cationic species is predominately $K^+$.

5. An ink according to claim 4 wherein the molar ratio of M1 to Mtot, satisfies Equation 2 as follows:

$$0.01 \leq M1/Mtot \leq 0.15 \tag{Eq. 2}$$

6. An ink according to claim 3 further comprising an anionic polymer additive.

7. The ink claim 6 wherein the anionic polymer additive is an anionic acrylic, styrene-acrylic or polyurethane polymer additive.

8. The ink of claim 7 wherein the molar ratio of M1 to Mtot, satisfies Equation 3 as follows:

$$0.2 \leq M1/Mtot \leq 0.50 \tag{Eq. 3}$$

9. An ink according to claim 3 further comprising ammonium ($NH_4^+$) cation.

10. An ink according to claim 3 wherein the second cationic species is predominately $Na^+$ and the molar ratio of M1 to Mtot satisfies Equation 4 as follows:

$$0.18 \leq M1/Mtot \leq 0.5 \tag{Eq. 4}$$

11. An ink according to claim 3 wherein the first humectant is present in an amount of between about 2 weight % and about 30 weight % based on the total weight of ink.

12. An ink according to claim 3 wherein the first humectant is present in an amount of between about 4 weight % and about 25 weight % based on the total weight of ink.

13. An ink according to claim 3 wherein the colorant consists essentially of self-dispersed pigment with anionic dispersibility-imparting surface groups.

14. The ink of any of the preceding claims wherein the pigment is self-dispersed carbon black.

15. An ink according to claim 3 wherein the decap time of said ink is substantially longer when compared to a ink of similar composition, but with no first cationic species; the decap time being defined as the amount of time an inkjet printhead, loaded with an ink, can be left uncapped and idle and still fire a drop of that ink without misdirection, loss of color or unacceptable decrease of velocity.

* * * * *